United States Patent [19]

Phipps

[11] 3,831,688

[45] Aug. 27, 1974

[54] SPRING BALANCE MECHANISM
[75] Inventor: Dennis Phipps, Llanelli, Wales
[73] Assignee: Cambrian Housewares Limited, Staffordshire, England
[22] Filed: Mar. 21, 1973
[21] Appl. No.: 343,592

[30] Foreign Application Priority Data
Mar. 25, 1972  Great Britain............... 14133/72

[52] U.S. Cl............... 177/229, 177/225, 177/231, 177/234, 177/238
[51] Int. Cl............................................ G01g 3/08
[58] Field of Search................... 177/166–170, 177/195, 225, 229, 230, 234, 173

[56] References Cited
UNITED STATES PATENTS

| | | | |
|---|---|---|---|
| 2,646,274 | 7/1953 | Weckerly | 177/229 X |
| 2,821,376 | 1/1958 | Aston | 177/229 X |
| 3,023,822 | 3/1962 | Knobel | 177/229 X |
| 3,443,653 | 5/1969 | Marshall | 177/229 X |
| 3,656,569 | 4/1972 | Johnson | 177/229 X |

FOREIGN PATENTS OR APPLICATIONS

| | | | |
|---|---|---|---|
| 506,941 | 11/1951 | Belgium | 177/229 |
| 824,909 | 12/1959 | Great Britain | 177/229 |

*Primary Examiner*—Richard B. Wilkinson
*Assistant Examiner*—Vit W. Miska
*Attorney, Agent, or Firm*—Markva & Smith

[57] ABSTRACT

A spring balance mechanism for weighing apparatus is built up in the form of a compact self-contained unitary assembly comprising a pair of similar L-shaped frame members in spaced inverted superposed relationship interconnected by parallel motion leaf spring members which are secured to flat step surfaces of the frame members. The top leaf spring member is rigidly connected along its length to a vertically depending elongate control arm of which the lower end abuts a weight indicator member pivotally mounted on the bottom frame member and thereby controls the movement of said indicator in accordance with load applied to the top frame member.

4 Claims, 7 Drawing Figures

3,831,688

SPRING BALANCE MECHANISM

This invention relates to spring balance mechanisms for weighing apparatus, especially, but not exclusively, weighing apparatus intended for domestic use such as, for example, kitchen scales.

An object of the invention is to provide improvements in the construction of spring balance mechanisms for weighing apparatus which can be especially advantageous from a manufacturing production and economic aspect as well as from a functional aspect.

Thus, the present invention provides a spring balance mechanism for weighing apparatus which conprises a plurality of parallel-motion leaf spring members, one of the leaf spring members being interconnected, at an intermediate point along its length, with a projecting elongate control member which deflects angularly or tilts in accordance with the deflection of said leaf spring member under load, the deflection or tilting movement of said control member being arranged to control movement of a pivoted indicator, such as a pointer or movable dial, the spring balance mechanism being constructed as a self-contained unitary assembly comprising an L-shaped rigid bottom frame member having mutually perpendicular limbs which provide, respectively, a base and an upstanding bracket or post to which latter is secured one end of each of the parallel-motion leaf spring members, and a separate inverted L-shaped rigid top frame member having mutually perpendicular limbs which provide, respectively, an upper carrier arm to support or provide a load-carrier member and a depending bracket or post to which is secured the opposite end of each of the parallel-motion leaf spring members, said base also providing a mounting for the pivoted indicator.

Preferably, the bottom frame member and the top frame member are both formed as unitary castings of similar form. They may be substantially indentical in dimensional characteristics and even interchangeable before assembly. The limbs providing the base and the upper carrier arm are conveniently of substantially flat plate-like form, and the unitary assembly of the mechanism preferably has an overall substantially rectangular contour.

In a preferred embodiment, the limbs providing the upstanding bracket or post and the depending bracket or post are stepped to form ledges or shelves which provide mountings and anchorages for at least one end of the leaf spring members.

The pivoted indicator preferably consists of a pivoted pointer which comprises an inner arm structure, pivotally mounted on the base of the spring balance mechanism so as to turn about a vertical axis, with an outer pointer stem or blade attached to, and forming an extension of, said inner arm structure. The invention also provides an improved construction of pointer in which the outer pointer stem or blade is detachably interlocked with and attached to the inner pivotally-mounted arm structure.

By way of example, one preferred embodiment of the invention will be more particularly described in relation to a spring balance mechanism incorporated in a domestic scale, especially for kitchen use, as illustrated in the accompanying drawings.

Figure 1:
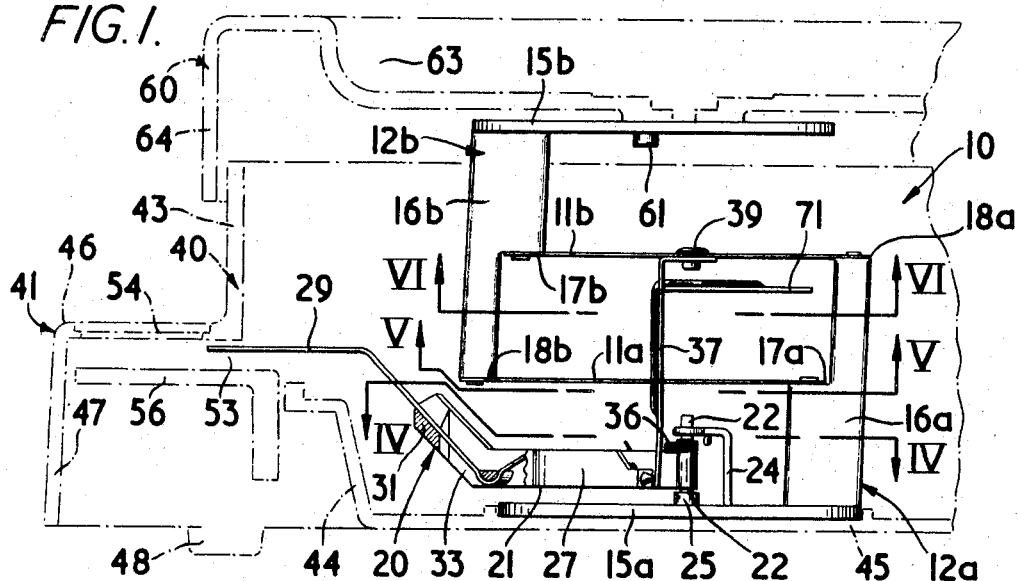
FIG. 1 is a part-sectional side elevational view of the spring balance mechanism of the scales showing, in broken lines, part of the associated body structure of the scales.

Referring to the drawings, the scales illustrated therein includes a spring balance mechanism 10, constructed in accordance with the invention, which is assembled as a self-contained unit and which comprises a pair of spaced leaf spring members, 11a, 11b, disposed one above the other and connected in a parallel-motion arrangement between an L-shaped bottom frame member 12a and an inverted L-shaped top frame member 12b.

The bottom frame member 12a is advantageously formed by a unitary rigid metal casting having mutually perpendicular limbs 15a and 16a. The one limb 15a is of substantially flat rectangular plate-like form and provides a base. The other limb 16a provides an integral upstanding bracket or post which has a stepped formation at an intermediate level to provide a transversely-extending ledge or shelf 17a. The bracket or post 16a also has a flat top surface 18a.

The top frame member 12b is likewise formed by a unitary rigid metal casting which is produced by the same mould and which, in this embodiment, is identical with that of the bottom frame member 12a. Top frame member 12b lies in inverted, substantially overlying, relationship with bottom frame member 12a and has limbs 15b and 16b, corresponding to 15a and 16a, which provide, respectively, an upper carrier arm and a depending bracket or post. The stepped formation of the latter provides a transversely-extending inverted ledge or shelf 17b. The bracket or post 16b also has a flat terminal bottom surface 18b.

As shown, the lower leaf spring member 11a is anchored or secured, by rivets, at one end to the ledge or shelf surface 17a and at the other end to the flat bottom surface 18b of the frame members 12a and 12b. The upper leaf spring member 11b is likewise anchored or secured, by rivets, at one end to the inverted ledge or shelf surface 17a and at the other end to the flat top surface 18a.

The base 15a also provides a mounting for a pivoted pointer 20 which co-operates with a graduated scale to serve as a weight indicator.

The pointer 20 comprises an inner arm structure 21, conveniently composed of a moulded plastics material, which is pivotally mounted so as to turn about a vertical axis by means of upper and lower vertically-aligned integral trunnion projections 22, 22, which engage in sockets provided respectively by a bracket 24 rivetted to the base 15a and by an integral cup-like formation 25 on said base.

The portion of the arm structure 21 adjacent the pivot mounting is bifurcated to provide a resiliently flexible tongue 27 in laterally spaced relationship to the inner main limb portion 23 of the arm structure 21.

Said main limb portion 23 has a screw-threaded hole in which is engaged a screw 28 which can be adjusted to control the spacing of the tongue 27.

The arm structure 21 also carries, as an outer extension thereof, a separate thin pointer stem or blade 29, advantageously formed of spring wire. This stem or blade 29 seats in grooves of bridge portions 31 and 32 between spaced side wall portions 33, 33', of the arm structure 21 and also in a downwardly-presented groove of an intermediate rib 34 projecting integrally from the one side wall portion 33. The relative positions and shapes of these parts are clearly shown in the drawings and it will be apparent that the inner portion of the stem or blade 29 is constrained and resiliently stressed to follow an angular path through the grooves and is thereby held or locked firmly in position. By this means, the stem or blade 29 can be quickly fitted during assembly and, if desired, it can also readily be removed, for example for replacement purposes if damaged, by bending it out of disengagement with the grooved portions of the arm structure 21, and a fresh replacement stem or blade can then be sprung into position.

Figure 2:
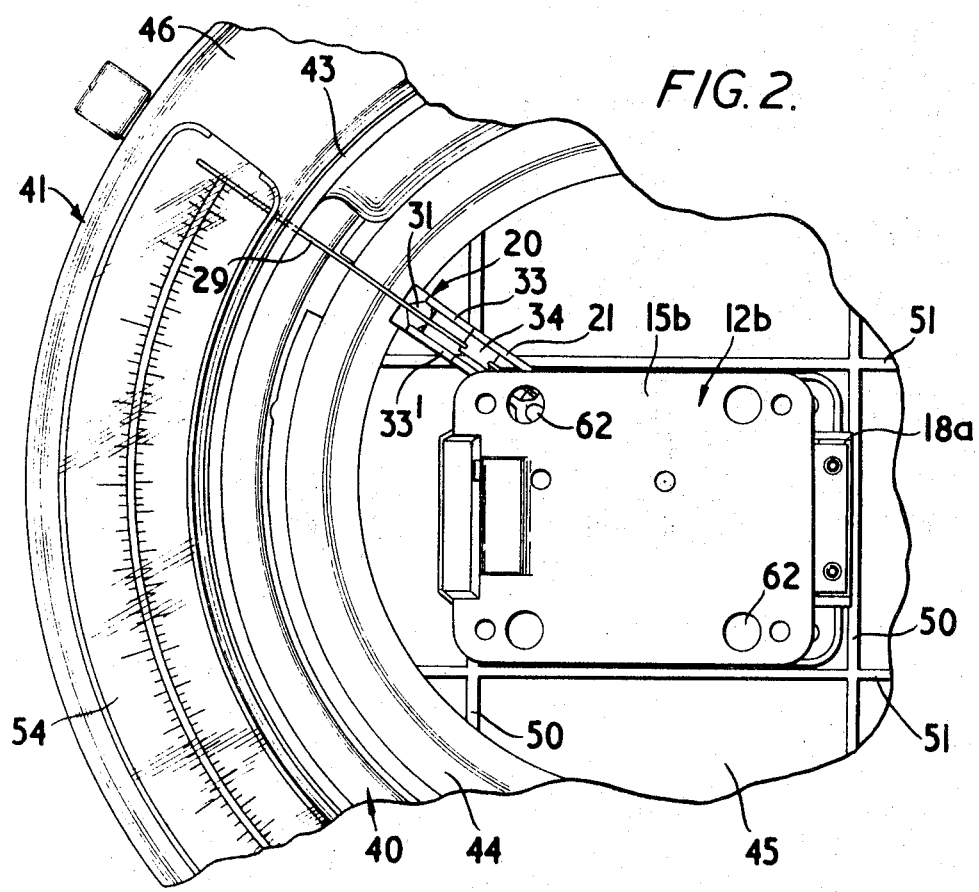
FIG. 2 is a fragmentary plan view of the scales with an upper weighing platform removed.

The pointer 20 is biassed to turn in a counter-clockwise direction, as viewed in FIG. 2, by a light torsion coil spring 36, fitted on the upper trunnion projection 22 of arm structure 21. Spring 36 has projecting legs which bear respectively against the pivot bracket 24 and the portion 23 of the arm structure 21, adjacent screw 28.

For controlling movement of the pointer 20, the free end of the tongue 27 abuts against the lower end of a control arm or bar 37 which passes through a clearance slot 38 in the lower leaf spring member 11a and which is formed by a T-shaped plate securely anchored at the top, by rivets 39, 39, to the upper leaf spring member 11b at a position intermediate the length of the latter. The general arrangement of the control arm or bar 37 and pivoted tongue is conventional in the art as illustrated in U.S. Pat. No. 2,821,376 to Aston.

As indicated in FIGS. 1 and 2, in this particular embodiment, the body of the scales, which is produced as a one-piece moulding in plastics material, provides a central hollow housing 40 of circular cross-section surrounded by an integral radially-projecting skirt structure 41.

The upper part of the housing 40 comprises a cylindrical wall 43 which extends upwardly from a horizontal top portion 46 of the skirt 41 and the lower part of the housing forms a well 44 having a floor 45. The skirt structure 41 is of angular section and includes the top portion 46 which is of annular disc form and which provides an annular platform or ledge around the housing, together with a peripheral cylindrical depending flange 47 having a plurality of shallow integral feet 48 spaced around its lower edge.

The spring balance mechanism 10 is seated in the lower part or well 44 of the housing 40 with the base 15a of the bottom frame member 12a being rivetted to the floor 45 of the well 44 and being located in a shallow rectangular recess produced by intersecting shallow upstanding ribs 50, 51 on the upper surface of said floor 45. As clearly seen in FIGS. 1 and 2, the outer stem or blade 29 of the pointer 20 projects through an aperture or slot 53 in the side of the housing 40 and the outer end portion underlies an arcuate segmental window slot 54 fitted with a transparent cover in the top 46 of the skirt 41.

The scales also include a weighing platform 60 forming a movable load-carrier member which is secured by a screw to the upper carrier arm 15b of the top frame member 12b and which is located thereon by a pair of depending integral pegs 61 fitting in holes 62 of the carrier arm. The weighing platform 60 is of circular form with a central recess or depression 63 adapted to locate the base of a weighing bowl or container which may be used with the scales, and a depending peripheral flange 64 of the platform overlaps, with clearance, the cylindrical upper wall 43 of the housing 40.

In use, when a load is placed on the platform 60, the leaf spring members 11a and 11b deflect and the control arm or bar 37 also is caused thereby to deflect angularly or tilt, in a vertical plane, and thereby permits the pointer 20 to move correspondingly through an angle correlated to the extent of the spring movement and magnitude of the applied load.

Extent of range of angular movement of the pointer 20 for a given load is determined by the positioning of the adjusting screw 28 which effectively controls the lever ratio between the point of contact of the control arm or bar 37 with the free end of tongue 27 and the pivotal axis of the pointer.

Figure 3:
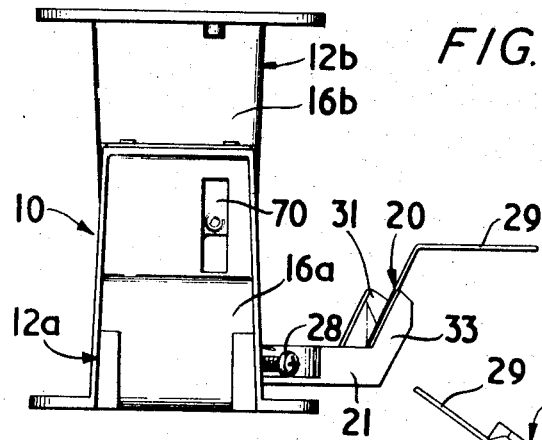
FIG. 3 is an end elevational view of the spring balance mechanism.
Figure 4:
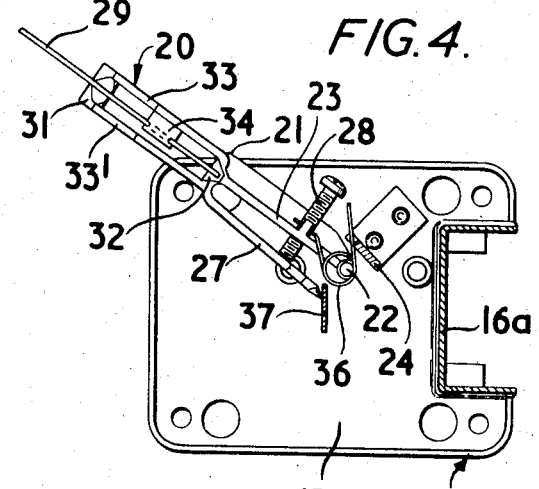
FIG. 4 is a horizontal section on line IV —IV of FIG. 1.
Figure 5:
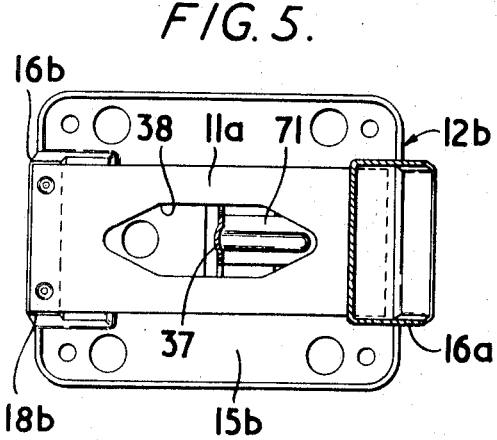
FIG. 5 is a horizontal section on line V —V of FIG. 1.
Figure 6:
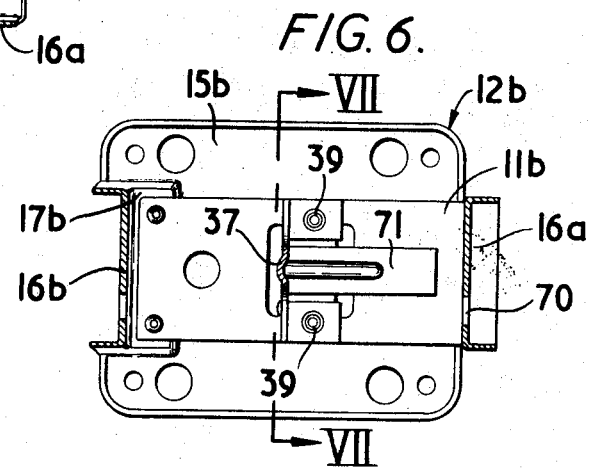
FIG. 6 is a horizontal section on line VI —VI of FIG. 1.
Figure 7:
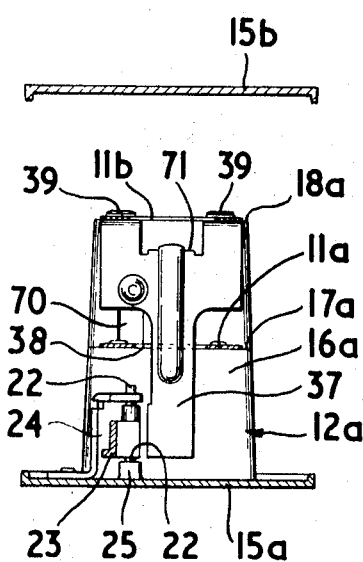
FIG. 7 is a vertical section on line VII —VII of FIG. 6.

If desired, a taring or zero control screw (not shown) may be provided which can either pass through an aperture 70 in the upstanding bracket or post 16a of the bottom frame member 12a (see FIG. 3) so as to engage directly the control arm or bar 37. Or, a taring or zero control screw can be arranged to pass through an aperture in the upper leaf spring member 11b so as to engage a horizontally-extending integral arm 71 struck out of the body of the plate forming the control arm or bar 37 adjacent said upper spring member 11b.

Throughout this specification, in the above description and in the claims, for clarity of terminology the spring balance mechanism has been assumed to be orientated so that the leaf spring members lie in substantially horizontal planes with the top and bottom frame members disposed vertically one above the other, but it will be understood that the scope of the invention is not considered to be limited to positioning of the mechanism with this orientation.

It will be appreciated that the spring balance mechanism 10, as herein described, is extremely convenient and economical to manufacture and assemble, and its compact unitary form provides a high degree of versatility which enables it readily to be used in weighing devices of many different physical structures. The particular construction described, however, has only been given by way of example. In some cases, if desired, the pivoted indicator may be a movable dial instead of a movable pointer, and it will further be understood that many other modifications and variations in the precise constructional details are possible within the scope of the invention as defined in the appended claims.

What I claim is:

1. A weighing apparatus comprising
   a. a spring balance mechanism,
   b. a housing for said spring balance mechanism,
   c. said housing including a floor, an integral projecting skirt structure and a wall structure extending upwardly from said skirt structure, said skirt and wall structures defining a cavity above said floor having an opening thereabove, d. said spring balance mechanism comprising a rigid bottom frame member of L-shaped configuration and consisting of two mutually perpendicular limbs providing respectively a base and an upstanding bracket, said upstanding bracket being positioned at one end of said base such that said base extends in one horizontal direction from said upstanding bracket, means securing said base to said floor of said housing at a substantially central location, a rigid top frame member of L-shaped configuration and consisting of two mutually perpendicular limbs providing respectively an upper load-receiving carrier arm and a depending bracket, said top frame member being disposed in an inverted superimposed spaced relationship above said bottom frame member with said load-receiving carrier arm in spaced parallel relation to and immediately above said base, said depending bracket being positioned at one end of said load-receiving carrier and above the end of said base opposite said one end thereof, said load-receiving carrier extending from said depending bracket in a horizontal direction opposite said one horizontal direction and the end of said load-receiving carrier opposite said one end thereof being positioned above said upstanding bracket, an upper leaf spring member and a vertically-spaced parallel lower leaf spring member, each of said leaf spring members extending horizontally at different levels between said upper load-receiving carrier arm and said base, the opposite ends of said leaf spring members being secured to said upstanding bracket and said depending bracket respectively, an angularly-movable weight indicator member, means pivotally mounting said weight indicator member, said mounting means being positioned on said base between said lower leaf spring member and said base, and a vertically depending elongated control member attached at its upper end to said upper leaf spring member at a position intermediate the opposite ends of said upper leaf spring member such that said control member tilts in a vertical plane in accordance with deflection of said leaf spring members under load, the lower end of said control member abutting said indicator member at a position spaced from its pivot axis to control pivotal movement of said indicator member in accordance with the extent of tilt of said control member, and e. a weighing platform substantially centrally located on said load-receiving carrier arm and including a depending peripheral flange overlapping said upwardly extending wall structure, f. whereby the application of load will be centralized to minimize torsional effects and said spring balance is enclosed by said housing and weighing platform.

2. A weighing apparatus according to claim 1 wherein the upstanding bracket of the bottom frame member has a step forming a ledge which provides a planar upwardly-presented horizontal attachment surface to which one end of the lower leaf spring member is secured, and the depending bracket of the top frame member has a step forming an inverted ledge which provides a planar downwardly-presented horizontal attachment surface to which one end of the upper leaf spring member is secured.

3. A weighing apparatus according to claim 1, wherein the top and bottom frame members are both formed as one-piece hollow castings having substantially identical dimensional characteristics, and wherein the base and the upper load receiving arm each have a rectangular plate form and are positioned in superimposed spaced relationship thereby providing the mechanism with a compact overall substantially rectangular box-like configuration.

4. A weighing apparatus according to claim 1 wherein the pivoted indicator member comprises an inner arm structure, a separate resilient outer pointer stem, and means detachably interlocking said outer pointer stem with said inner arm structure, said means comprising first and second spaced bridge elements on said inner arm structure supporting one side of said outer pointer stem at spaced locations and a rib element on said inner arm structure disposed intermediate, and out of alignment with, said bridge elements, depressing the opposite side of said outer pointer stem at a position intermediate said spaced locations whereby said pointer stem is constrained and resiliently stressed into an angular configuration in engagement with said inner arm structure.

* * * * *